Figures 1, 2:
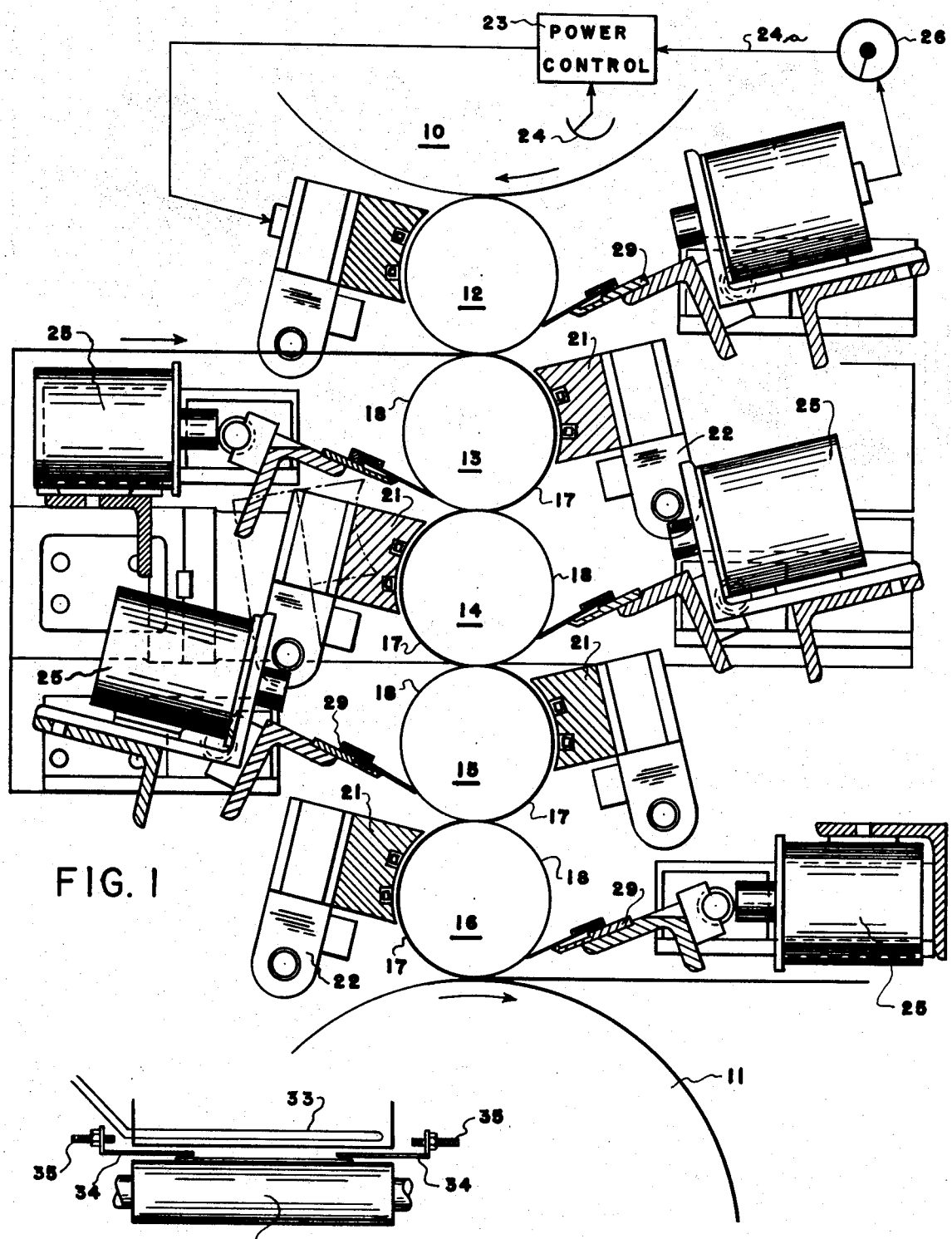

United States Patent
Greenberger

[15] 3,702,912
[45] Nov. 14, 1972

[54] METHOD OF AND APPARATUS FOR CALENDERING STRIP-LIKE MATERIAL

[72] Inventor: Joseph Irwin Greenberger, Pittsburgh, Pa.

[73] Assignee: Wean United, Inc., Pittsburgh, Pa.

[22] Filed: Feb. 4, 1971

[21] Appl. No.: 112,648

[52] U.S. Cl..............................219/10.61, 219/10.41
[51] Int. Cl..............................................H05b 5/00
[58] Field of Search.........................219/10.61, 10.41

[56] References Cited

UNITED STATES PATENTS

| | | | |
|---|---|---|---|
| 2,761,941 | 9/1956 | Ardichvili | 219/10.61 X |
| 3,268,704 | 9/1966 | Cornwell | 219/10.61 |
| 2,766,362 | 10/1956 | Kinder et al. | 219/10.61 X |
| 2,951,139 | 7/1960 | Washburn | 219/10.61 |
| 3,103,571 | 9/1963 | Axelsson et al. | 219/10.61 |

Primary Examiner—J. V. Truhe
Assistant Examiner—Hugh D. Jaeger
Attorney—Henry C. Westin

[57] ABSTRACT

The disclosure of this invention relates to a method and apparatus for processing strip-like material, such as paper and synthetics. It includes a multi-roll calender in which the material is passed around the rolls in a serpentine manner so that the rolls have material-contacting portions and nonmaterial-contacting portions. External induction heating is applied to the material-contacting portions of the rolls to heat the rolls immediately under the material. The temperature of the rolls are measured by sensors at the noncontacting portions of the rolls.

11 Claims, 2 Drawing Figures

INVENTOR
JOSEPH I. GREENBERGER
BY
HENRY C. WESTIN
ATTORNEY

METHOD OF AND APPARATUS FOR CALENDERING STRIP-LIKE MATERIAL

In the past in the manufacture of paper, synthetics, and other web-like materials, the material was subject to a calendering operation in which heat was imparted to the material by internally heating the calender rolls through heated fluid. Some attempts have also been made to externally heat the rolls by hot gases or radiant heat.

The latter has not proven successful because it represented a very slow method and one that was difficult to quickly control, and additionally involved applying the heat to the noncontacting portions of the rolls. The internal heating procedure, which was the more commonly employed of the two, has been found in practice to be limited to fairly large diameter rolls. This limitation was a result of the physical construction of such rolls in which holes or passageways were drilled or machined in the outer periphery of the rolls requiring substantial material, along with other considerations that dictate that the minimum diameter typically be about 12 inches. Such internally heated rolls also inherently included basic limitations in the rate of heat transfer, which limited the operational speed of the calender. The drilling operation of the outer holes, since a degree of accuracy was required, limited the length of the rolls to approximately 100 inches in roll face.

It is the object of the present invention to provide a method and apparatus for overcoming each and every one of the aforesaid limitations of existing calenders and, in addition, to provide other benefits.

More particularly, the present invention provides a method of an apparatus for processing strip-like material, such as paper and synthetics, employing a calendering operation in which a roll thereof has a material-contacting portion and a nonmaterial-contacting portion, applying external induction heating to the material-contacting portion to heat said one roll immediately under the material, and measuring the roll temperature by a sensor at the noncontacting portion of the roll.

It is a further object of the present invention to provide a method and apparatus for processing strip-like material, such as paper, synthetics, or any fibrous material, employing a calendering operation in which a number of small diameter rolls are provided with material-contacting portions and nonmaterial-contacting portions, applying external induction heating to the material-contacting portions to heat selectively and controllably only the outer periphery of the rolls through the material, measuring the temperature of said rolls on the noncontacting portion thereof, and varying the applied heat until said measured temperatures equal a desired temperature.

These objects, as well as other novel features and advantages of the present invention, will be more fully understood when the following description is read along with the accompanying drawings, of which:

FIG. 1 is a sectional view of a multi-high calender incorporating the method and apparatus of the present invention, and FIG. 2 is a diagrammatical view of a second embodiment of the present invention.

FIG. 1 illustrates a several-roll calender for processing synthetic material, such as nylon. The calender is constructed according to well-known practice and consists of upper and lower outer supporting iron or steel rolls 10 and 11, respectively, and interior smaller diameter iron or steel rolls 12–16. The housing and bearing chock assemblies, as well as other well-known components of the calender, are not shown for simplicity. The rolls will be driven so as to convey the material in a serpentine fashion, first between the rolls 12 and 13 and finally between the rolls 11 and 16.

Each of the small calender rolls 13–16 has a substantial material-contacting portion 17 and a substantial nonmaterial-contacting portion 18, these portions representing approximately one half of the circumference of each roll. Adjacent the material-contacting portions and extending along the entire faces thereof of the rolls 13–16 and at the left of the roll 12 are arranged separate inductors 21 which may follow the general principle and function of the type supplied by the Ajax Magnethermic Corporation of Warren, Ohio, although other types just as readily available may be employed.

The inductors are pivotally and adjustably mounted on arms 22 secured to the frame of the calender, not shown. The pivotal mounting allows the air gap between the inductors and the rolls to be varied and a desired operating gap maintained. The mounting also permits the inductors to move freely away from the rolls to avoid damage to the inductors in the event a cobble is formed between the rolls.

Each inductor 21 will have a control similar to the one shown for the inductor of the roll 12. The control includes a power control unit 23 that receives a desired temperature signal from an adjustable potentiometer 24 along with a measured temperature signal from a line 24a. The power control unit will vary the power going to the inductor to reduce any difference between the two input values to zero.

On the noncontacting side of the rolls 13–16 and at the right of the roll 12, a generally centrally located, sensitive, low-temperature sensor 25 that may follow the general type in principle and function supplied by Ircon, Inc. of Niles, Illinois, as illustrated in their Bulletin 6000, is mounted on the frame of the calender. The sensors are directed to measure the temperature of the noncontacting surface of the rolls. The sensor for roll 12 illustrates a temperature gauge 26 which also is associated with a signal line 24a that feeds the temperature signal to the power control unit 23. The other sensors will have similar instrumentation.

According to usual practice, rolls 12–16 are provided with doctor blade assemblies 29 which contact the nonmaterial-contacting portions of the rolls and which are arranged to allow the sensors 25 to be properly positioned relative to their associated rolls.

FIG. 2 illustrates a shielding arrangement for one or more of the rolls 12–16 which can be employed should it be desired to avoid or reduce the heat imparted to the edges of the material. Accordingly, there is shown with a roll 32 an inductor 33 in which adjustable shields 34, made for example of copper, are positioned between the inductor 33 and the roll 32 to blanket or absorb some or all of the induced heat at the ends of the roll. The shields may be positioned axially of the roll by hand-adjusted nut and screw arrangements 35.

A brief explanation of the method of operating the apparatus described is as follows. In calendering nylon material where small diameter rolls are required to effect the proper calendering operation, the present invention permits the rolls 12–16 to have small diameters of the order of 6 inches in which their lengths may substantially exceed 100 inches long. For an air gap of one-fourth inch between the inductors 21 and the rolls 12–16 a 3,000 cycle power fed to the inductors will generate the proper heating condition in the material. By heating the rolls through the material, the heat will be generated only immediately under the material and in the outer one-fourth to one-half inch of the rolls in which the web, serving as a heat sink, will rapidly extract its heat so that overheating of the roll surfaces will be avoided. Since the normal web material is dielectric in behavior, the 3,000 cycle power will not cause induced heating to the web itself. Because of this procedure of heating the rolls and material, the operating speeds are limited only by the rate at which heat transfers into the material, which will be extremely rapid.

The sensors 25 not only measure the temperatures of the respective rolls so that any objectionable variation can be corrected, but will allow the temperature to be controlled automatically with reference to a desired temperature set by the potentiometer 24 through the agency of the power control unit 23.

In accordance with the provisions of the patent statutes, I have explained the principle and operation of my invention and have illustrated and described what I consider to represent the best embodiment thereof.

I claim:

1. A method of calendering strip-like material comprising the steps of:
    passing the material around different portions of at least two cooperating rotating calender rolls,
    applying heat by induction externally to the entire portion of each roll around which the material comes into contact to heat only the outer periphery of the rolls through the material,
    measuring the temperature of said rolls on the nonmaterial-contacting portions thereof, and
    varying the applied heat until a measured temperature equals a desired temperature.

2. A method according to claim 1 in which said step for applying heat includes applying said heat along the entire lengths of said rolls and controlling the applied heat to heat said rolls only immediately under the material.

3. A method according to claim 1 in which said rolls are made up of iron or steel.

4. A method according to claim 1 including the additional step of selecting the cycle of the induction heating with reference to the dielectric nature of the material such that the applied heat will not be induced into the material and the material will extract its heat substantially entirely from the rolls.

5. A method according to claim 1 including the step of only applying heat to the portions inward of the edge of the material.

6. A calender or like device comprising:
    at least two cooperating rotating rolls around which material to be processed passes in a manner that the rolls have different material-contacting portions and different nonmaterial-contacting portions,
    induction heating means for at least one roll arranged to externally heat the entire material-contacting portion thereof in a manner to heat only the outer periphery of said one roll,
    temperature measuring means for said one roll arranged to measure the temperature of the non-material-contacting portion of said one roll, and
    means for varying the heat output of said induction heating means until the measured temperature equals a desired temperature.

7. A calender or like device according to claim 6 in which said heating means includes means for heating the entire length of the material contacting portion of said one roll.

8. A calender or like device according to claim 6 in which said calender rolls are formed of iron or steel.

9. A calender or like device according to claim 6 including heat shields arranged at the opposite end of said one roll between said induction heating means and said material-contacting portion thereof, and
    means for adjusting said shields axially of said roll.

10. A calender or like device according to claim 6 in which said calender comprises several small diameter rolls arranged in a common vertical plane,
    backup rolls arranged in said vertical plane for supporting the two opposite outer small diameter rolls,
    at least two of said small diameter rolls having said material-contacting and nonmaterial-contacting portions,
    one of said induction heating means for each of said two rolls,
    one of said temperature measuring means for each of said two rolls.

11. A calender or like device according to claim 6 including support means for said induction heating means, and
    means for maintaining said heating means close to said material-contacting portion of said one roll with a controllable air gap between said heating means and said one roll.

* * * * *